Oct. 16, 1962

J. J. EVERARD ETAL 3,059,131

SYNCHRONOUS MOTORS

Filed May 10, 1961

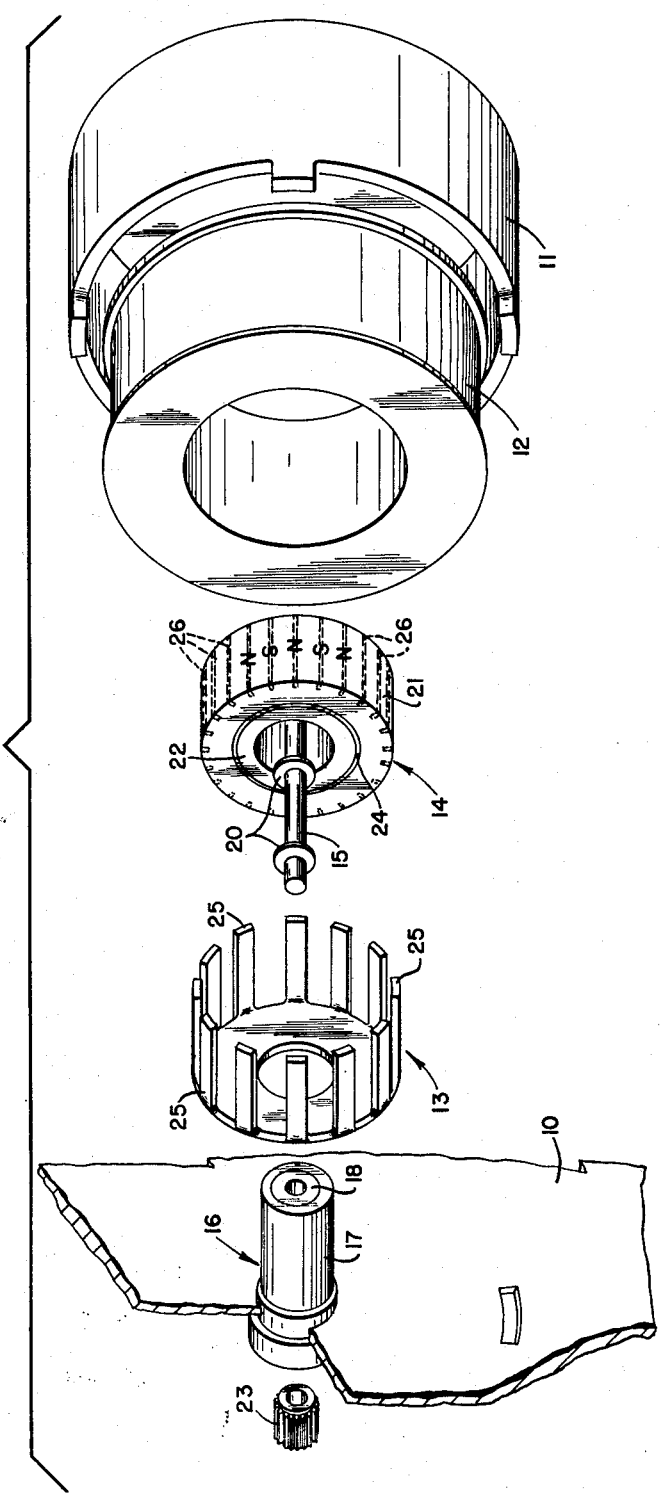

Oct. 16, 1962 J. J. EVERARD ETAL 3,059,131
SYNCHRONOUS MOTORS
Filed May 10, 1961 3 Sheets-Sheet 3

United States Patent Office 3,059,131
Patented Oct. 16, 1962

3,059,131
SYNCHRONOUS MOTORS
Joseph J. Everard and Robert A. Heinzen, Manitowoc, Wis., assignors, by mesne assignments, to Consolidated Electronics Industries Corp., Waterbury, Conn., a corporation of Delaware
Filed May 10, 1961, Ser. No. 109,227
24 Claims. (Cl. 310—164)

This application is a continuation-in-part of application Serial No. 103,069, filed April 14, 1961.

This invention relates to electric rotating machines and is particularly applicable to self-starting synchronous motors.

More particularly, the invention is especially useful in self-starting, alternating current, synchronous motors having a permanently magnetized rotor.

There has long existed a problem of providing a satisfactory alternating current motor which will be self-starting, which will run at synchronous speed, and which is highly reliable.

There have been a variety of proposals in an effort to develop satisfactory motors having such characteristics, but such earlier proposals have had disadvantages — for example, such disadvantages as that the starting or running torque was low, that the motors were complex in design and expensive to construct or that they were unreliable in self-starting or in synchronous operation.

One problem which has existed in alternating current motors employing a permanently magnetized rotor is that in some cases, when the stator is de-energized, the rotor may stop at such a position that when the stator is again energized, the rotor will not again start to rotate. Various proposals have heretofore been made to cause such motors to start, but such prior proposals have added undesirable complexity and expense to the motor designs.

One object of the present invention is to provide a small synchronous electric motor which is self-starting and which has good starting and running torque, and which is less complex than motors heretofore proposed.

We have discovered a motor construction which, while not requiring certain expedients formerly employed, nevertheless provides extremely good reliability in self-starting and in running. The design of the motor of the present invention eliminates certain parts heretofore generally believed to be necessary and the motor is believed to be entirely novel in structure and in its principles of operation.

In previous motors having a plurality of salient stator pole faces spaced around a permanently magnetized rotor, the construction was typically such that at a given moment, some of the salient stator poles were of one polarity and some of them were of the opposite polarity, there being, thus two sets of the salient stator poles.

In contrast to this prior arrangement, we have discovered a novel motor construction which, in certain embodiments, requires only a single set of salient stator poles. These salient stator poles are energized with an alternating magnetic field, and, at a given moment, all of them are of the same magnetic polarity.

In the motor of the present invention, a novel principle is employed to cause the rotor to assume a particular quiescent position when the stator is de-energized, which will produce self-starting when the stator is again energized, this quiescent position being a different one from those of earlier motors, and being caused by a different principle of operation.

In one highly advantageous embodiment, the quiescent position of the rotor is one in which each stator pole bridges the space between a pair of rotor poles of opposite polarity. In a preferred construction, the rotor consistently stops where it is offset by approximately 90 electrical degrees from a position in which a given rotor pole is opposite a given stator pole.

The expression 90 electrical degrees, as used in the present context, means one-fourth the angular distance from one rotor pole to the next rotor pole of like polarity.

The motors of the present invention enable such an improvement in economy of design while attaining excellent reliability of starting and operating characteristics, and represents such a departure from the principles which had been accepted in the prior art, that these motors represent a major breakthrough in the art.

The foregoing and other objects, features and advantages of the invention will be apparent from the following more particular description of preferred embodiments of the invention, as illustrated in the accompanying drawings.

FIG. 2 is an exploded perspective view, partially broken away, of the embodiment of FIG. 1 to illustrate the relationship of principal components.

Figure 1:
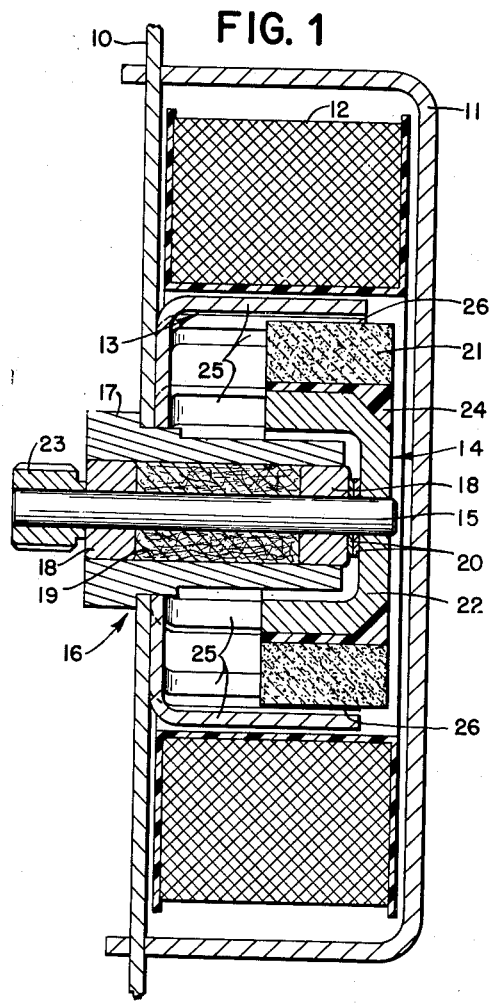
FIG. 1 is a sectional view of an embodiment of a motor according to the present invention, the section plane being one passing longitudinally through the axis of the motor.

In many cases motors are required which will reliably operate for long periods of time in a sealed or inaccessible unit where maintenance is impossible. Especially under such circumstances, simplicity of construction may tend to increase reliability, because additional motor parts are often additional potential sources of failure. In some applications, as in air-borne or space vehicles for example, it is desirable to reduce the total weight and size of the motor, and to reduce the number of parts.

Also, in some cases motors are required for use in devices which are intended to be discarded and replaced, after a period of time, rather than repaired. Because every additional part usually represents an added cost, it is desirable in such motors to minimize the number of parts.

The mechanical configurations for various motors embodying the teachings of the present invention are varied.

In one embodiment there is provided a cylindrical rotor including a ring-shaped member of ferrite material magnetized in localized regions so as to include pairs of non-salient magnetic poles uniformly spaced about its axis of rotation, adjacent poles being of opposite magnetic polarity. A metallic stator member has salient stator poles spaced around the rotor. Where considerations of running torque are important, there are advantages in using the largest possible total circumferential area of overlap between the salient stator poles and the rotor magnet. Thus, with one set of salient stator poles, maximum torque may be obtained when the number of stator poles equals the number of pole pairs appearing at the surface of the rotor magnet. Thus in one illustration, for a 300 r.p.m. motor, the rotor may include 24 magnetized regions (12 north and 12 south poles). Twelve salient stator poles may be arranged around the rotor, spaced apart at intervals of 30 mechanical degrees. From the viewpoint that the distance between one north pole on the rotor, for example, to the next north pole corresponds to 360 electrical degrees, the spacing of the stator poles may be described as corresponding to 360 electrical degrees, in this illustration. In some cases, the spacing of the stator poles may correspond to (N) (360) electrical degrees, where (N) is an integer.

The stator is energized by a coil from an alternating current supply. When the motor is turned off, de-energizing the stator, the rotor stops in a position where rotor poles are displaced approximately 90 electrical degrees from stator poles, as stated. That is, the rotor stops with pairs of its oppositely polarized areas uniformly centered about the stator poles. Hence each stator pole bridges the space between a pair of rotor poles of opposite polarity, the stator pole being approximately centered in that space. The term "quiescent position" is used in the present application to refer to the position assumed by the rotor when the stator is de-energized. An important advantage of the quiescent position described above, displaced 90 electrical degrees from a rotor position where similar rotor poles would be centered opposite the stator poles, is that when the stator is again energized, the motor is self-starting. Furthermore, this rotor position is an exceptionally good one from the standpoint of producing good starting torque. This is an extremely desirable feature.

For causing the rotor to assume this quiescent position, the stator and rotor are so constructed that, when no current is flowing through its coil, the reluctance of the magnetic path, from one rotor pole across a stator pole (circumferentially), to a rotor pole of opposite polarity, and thence through the rotor to the first pole, is less than the reluctance of the path from one rotor pole to a stator pole, thence through the stator structure (or by proximity directly) to another stator pole, then to a rotor pole of opposite polarity, and then through the rotor to the first mentioned rotor pole.

When the stator is de-energized, the rotor will stop in a position where its own magnetic poles find the lowest reluctance path. Because of the reluctance relationships just stated, the rotor in our motors will stop in the preferred starting position which has been described, this being the position where the lowest reluctance path for the rotor flux exists. This relationship depends not only on the construction of the stator, including its poles and the other associated members in magnetic circuit therewith, but also depends in part on the fact that the rotor magnet material employed has high reluctance and has a high coercive force characteristic which causes it to hold its pattern of magnetization physically fixed. This material, in a preferred embodiment, comprises barium ferrite.

Also of importance for reliable starting is the ratio of the torque to the inertia of the rotor, this being related to the energy product of the rotor material versus its mass. The rotor should reach synchronous speed in the first complete one-half cycle.

Thus the construction of the stator and of the rotor, their physical configuration, their magnetic properties (reluctance), and their interrelationship aid in causing the rotor to assume the novel quiescent position described herein, and to start reliably when the stator poles are energized in the novel manner described.

Although one of the important features of certain embodiments of the present invention is the provision of a motor having a single set of salient stator poles adjacent the rotor, and there are unique advantages in such an arrangement, the invention is not, in its broadest aspect limited to such an arrangement.

For example, in some more complex motors employing the present invention, there may be employed one set of salient stator poles which cooperates with the rotor in one region, arranged so that the stator and rotor poles interact as described above, but this does not necessarily prohibit the use of additional stator poles elsewhere in the motor.

Hence it should be understood that the motors shown in the attached drawings are only illustrative of a broad class of motors which may employ our invention.

A wide variety of other arrangements are possible, representing elaborations on and modifications of the basic form of the motors of the present invention.

One embodiment of the invention is shown in FIGURES 1 and 2 of the drawings. In this form, the motor comprises a stator housing including a mounting plate 10 and a cover 11, a field coil 12, a stator polar structure 13 and rotor 14. As shown, the rotor is mounted on a shaft 15 and supported for rotation in a bearing assembly 16 that is mounted in the center of one side of the stator housing. Any suitable bearing assembly may be used. In this illustrative form, the bearing assembly shown comprises a journal piece 17, sintered bronze bearings 18 and a lubricating wick 19 supported inside the journal. A pair of thrust washers is also shown at 20.

The rotor 14 comprises an annular member 21 which has a plurality of permanently magnetized regions induced at its peripheral surface. The annular member 21 is supported on a rotor hub piece 22 which is attached to the shaft 15. The hub may be composed of any light weight material of suitable strength, such as thermosetting plastic or aluminum. As shown, the hub 22, of aluminum in this illustration, is hollowed out on one side to minimize rotating mass. A drive pinion gear is shown at 23 mounted on the outer end of the rotor shaft.

The permanent magnet member 21 may be secured to the rotor by a variety of techniques such, for example, as cementing or die cast technique. A suitable bonding material 24, for example, one of the epoxy type, or others of the thermo-setting or thermoplastic type, may be employed for holding the magnet member in place coaxially with the rotation axis. The material 24 may be cast in place between the annular member 21 and aluminum hub 22 and allowed to harden to provide the arrangement illustrated. Alternatively, a zinc die cast alloy can be used to fasten the magnet member 21 directly to the shaft 15, thus eliminating rotor hub 22. The latter is the preferred embodiment.

In the exploded perspective of FIG. 2, stator member 13 is shown most clearly. It comprises a base from which projects a set of salient members or poles 25. There are 12 of these salient poles in this illustration. The base has a center aperture so that the pole piece is adapted to be held in place on bearing assembly 16 in FIG. 1. Poles 25 are arranged in a substantially cylindrical surface at uniform angularly spaced positions. In this embodiment the poles project part way through the central aperture of the field coil 12. For this arrangement the stator poles may also be utilized for supporting the field coil in place radially in the stator housing. The poles 25 overlap the magnetized periphery of rotor member 21, the poles being, in this illustration, long enough to overlap approximately four-fifths of the length of the member 21. As shown in FIG. 1, the poles 25 do not extend as far as the opposite stator housing cover 11. An air gap remains between the ends of poles 25 and cover 11. This air gap is larger than the air gap between the rotor member 21 and the cover 11, to cause the preferred path of magnetic flux from the stator poles to pass through the rotor on its way to the cover. The diameter of the rotor magnet is also such as to provide a small air gap between the rotor and stator poles to permit rotation, and to permit interaction between the stator poles and the rotor poles.

The stator structure includes members 10, 11 and 13 of metallic material, for example steel, having relatively high permeability, so as to form low reluctance portions of paths for magnetic flux. This is in contrast to the rotor magnet member 21, which is constructed so as to be of much higher reluctance.

This rotor magnet member 21, in a preferred embodiment, comprises a magnetic material having high coercivity, and low permeability, and relatively low-specific gravity. A satisfactory material for this purpose is a barium ferrite material, which is ceramic in nature, commercially available, for example, as "Magnadure" from the Ferroxcube Corporation of America. This material is magnetically "hard," having a very high value of coercivity, approximately 1600 oersteds. Its specific gravity is about 4.5, and its permeability is approximately equal to that of air.

This material is also available in Europe, designated as "Ferroxdure I."

Other commercially available barium ferrite materials suitable for the magnet member 21 and having properties about like those of the products referred to above, are, for example, "Indox I," manufactured by Indiana Steel Products Division of Indiana General Corp., or "Ceramagnet A" manufactured by the Stackpole Carbon Company, Electronic Components Division, St. Marys, Pennsylvania. The chemical composition of barium ferrite is $BaFe_{12}O_{19}$.

Although materials of the character described above may be employed to advantage in isotropic (non-oriented) form, the invention is not, in its broadest aspect, limited to the use of isotropic or non-oriented type materials in the rotor magnet member.

The rotor material, being magnetically hard, enables the placing of poles of opposite polarity very close to each other on the periphery of the rotor to form a non-salient pole type rotor and the magnetic field intensity established by these poles does not deteriorate during operation or with age.

Figure 3:
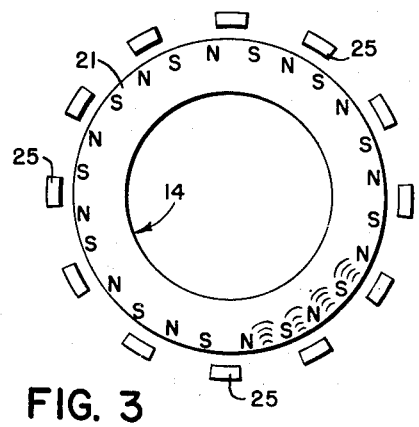
FIG. 3 is a schematic drawing showing the magnetic relation between the rotor and the stator poles of the embodiment of FIG. 1. The point of view in this schematic drawing is one where the rotor and the stator poles are viewed end-on, for example from their right-hand side, certain parts being removed for clarity of illustration.

As indicated schematically in FIG. 3, pairs of poles of the rotor are induced in the periphery of the rotor magnetic material. In this particular embodiment there are twenty-four poles (twelve pole pairs) uniformly spaced about the axis of rotation. Adjacent poles at the surface of the rotor are of opposite polarity. The direction of magnetization in this illustration is predominantly radial —that is, perpendicular to the axis of rotation. For purposes of illustration we have shown in dotted outline in FIG. 2 the approximate regions of the rotor material which acquire a particular magnetic orientation to form poles and these have been arbitrarily designated N and S (identified by numeral 26) to indicate north and south poles. As may be seen in FIG. 2, the shape of the magnetized regions is such that these regions extend the length of the rotor, in this illustrative motor.

The configuration of the magnetized regions of the rotor, as viewed in cross section, is illustrated schematically in a portion of FIGURE 3, where arcuate flux lines have been drawn between certain of the pairs of magnetic poles. In general, the individual magnetic poles are relatively wide, separated by relatively thin regions having little or no magnetism.

In the process of permanently magnetizing the rotor member, a relatively high unidirectional current flowing in a suitably shaped coil is used to provide the magnetizing force necessary to induce the poles in this material. The high coercivity characteristic of the material insures that the magnetized regions induced in the rotor are permanent. They are undisturbed by operating stator flux fields, even though a motor may be over excited by several hundred percent, and do not deteriorate with age.

The stator of the motor being described has only one set of salient stator poles. All of pole members 25 are always of the same instantaneous magnetic polarity when they are excited by the alternating magnetic field applied by the coil 21, when alternating current is applied to that coil. Conventional practice would point toward a necessity for another set of stator poles to make the rotor turn as well as some type of device, such as shaded poles, to make the rotor start. But in our invention such conventional expedients are not necessarily required. The motor of FIG. 1 will start and run on single phase power, with useful starting and running torques.

For the stator shown, the return flux path is provided by the stator cover pieces 11 and 10. If the poles 25 are assumed at a given instant to be north poles, the question may be raised as to whether the cover piece 11 is a south pole. Actually it is not a pole in the usual sense of the word in electric motor terminology. It is rather a return path without polar definition.

The presence of high permeability cover pieces 10 and 11 provides a low reluctance flux path so that the stator field can be established without abnormally high requirements for excitation power.

FIG. 3 shows the relative positions of the rotor 14 and the stator poles 25 with no voltage applied to the field coil. The rotor magnetic poles in each pair are displaced 90 electrical degrees from the center of the adjacent stator pole. This represents the quiescent position of minimum reluctance which the rotor will always seek and assume when field power is interrupted.

Hence, it may be seen that in the motor of this embodiment the field poles have uniform center to center angular spacings equal to 360 electrical degrees.

This spacing may alternatively be an integral multiple of 360 electrical degrees in which case for a motor such as that of FIG. 1 there would be fewer salient poles and net torque would be diminished.

Figure 4:
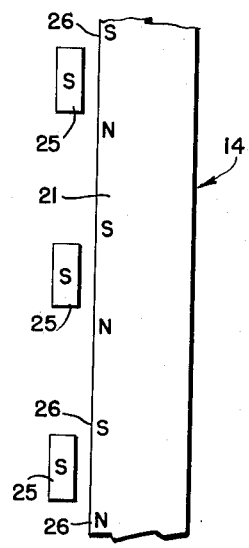
FIG. 4 is a schematic enlargement of a portion of FIG. 3, drawn in development form, to illustrate the magnetic conditions in the quiescent position of the rotor.
Figure 5:
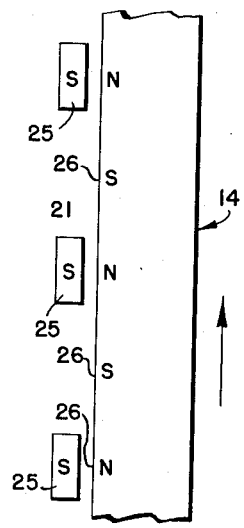
FIG. 5 is a schematic view similar to that of FIG. 4 illustrating typical magnetic conditions during starting after the rotor has advanced somewhat.

FIGS. 4 and 5 represent graphic developments of a typical portion of the stator and rotor of FIG. 3. When power is applied to the field coil, field poles 25 obtain a polarity and the nearest opposite magnetic poles of the rotor will be pulled to the center of the stator poles. The stator poles repel the nearest rotor poles of like polarity. An arbitrary "S" polarity for the stator poles is shown which results in clockwise rotation of the rotor shown under the assumed conditions. The rotor thus moves from the position shown in FIG. 4 to the position shown in FIG. 5, in starting.

With opposite initial stator polarity, the starting direction would be reversed.

In certain embodiments, the motor will thus start and run either in a clockwise direction or in a counterclockwise direction, depending upon the exact moment when it is energized and hence upon the phase or polarity condition of the energizing current when the motor is energized. This bi-directional characteristic is satisfactory for a number of motor applications.

If unidirectional operation of the motor is desired, any of several common mechanical "no-back" devices may be incorporated, for example, those of the camming type, of the friction-operated pawl type, or the ball type. In some cases it is desirable, in this connection, to provide some back-lash between the motor and its load to aid this no-back starting operation.

Alternatively, various non-mechanical arrangements may be employed to assure unidirectional operation.

In some motor applications where a unidirectional drive may be needed, it is satisfactory to allow the motor itself to have a bi-directional characteristic, and to interpose between the motor and the load a mechanical device of known type for converting a bi-directional drive into a unidirectional drive. For example, the bi-directional drive may be converted to oscillating motion, which, by a ratchet device, may be converted to unidirectional motion.

With a proper balance between size of the stator poles and rotor inertia, the motors of this invention can be made for operation over a wide range of voltage and load conditions.

The stator pole width of our motors may, in certain examples, be in the range from approximately 120 electrical degrees to approximately 180 electrical degrees.

For example, in one satisfactory motor, the stator pole width may be about 140 degrees, but the optimum width will vary depending upon the relation desired between starting and running torque and upon other aspects of the motor design and geometry. In a typical case, where other factors remain constant, the wider the stator poles the greater is the starting torque relative to running torque, within limits.

One of many advantages of employing a design in which adjacent stator poles are of like polarity is that leakage of flux from one stator pole to the next through the intervening space is eliminated. This is in contrast to typical designs where a salient pole of one polarity is adjacent one of opposite polarity, and if they are spaced close together, flux leakage to an undesirable degree may occur.

A wide variety of configurations can be used for the stator and rotor structures in motors embodying the basic teachings of our invention.

The number of stator poles determines synchronous operating speed. Thus, for 60 cycle single-phase power, the motor in the embodiment of FIG. 1 has a synchronous operating speed of 300 r.p.m. since the rotor will turn at a rate of 30 degrees (mechanical) for each cycle of applied alternating field voltage.

The length of the field poles is also important in establishing maximum torque in the motors of our invention. Good starting and running torques can be achieved in the embodiment of FIG. 1 when the stator poles overlap approximately ⅘ of the length of the magnetized rotor face. A shorter pole length increases the air gap reluctance of the stator field flux path, which tends to weaken the stator field for a given applied voltage and decrease the effectiveness of the available rotor flux in producing torque.

Figure 6:
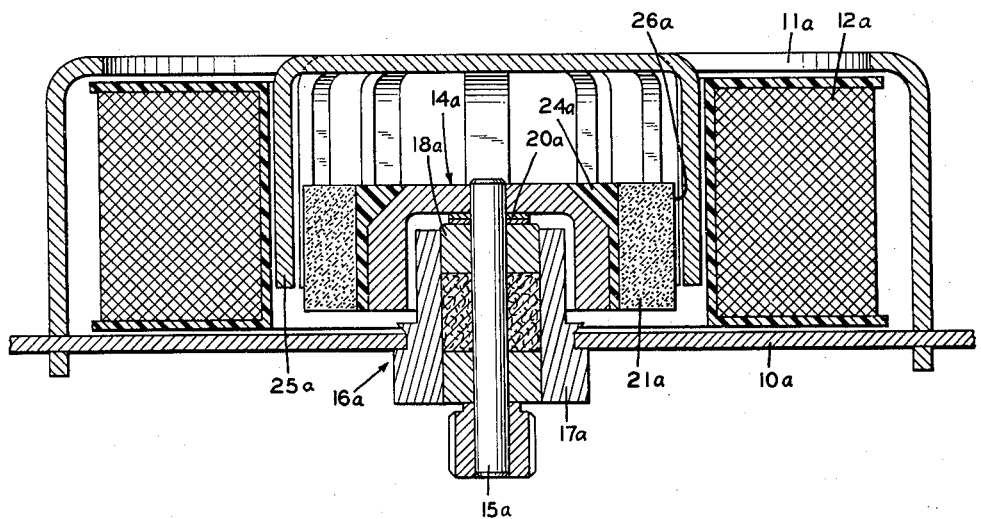
FIG. 6 is a longitudinal sectional view of another embodiment of a motor including the present invention, and which differs from the one shown in the preceding figures in that the sailent stator poles are formed from portions of the housing cover, bent inwardly, and their position and orientation in the motor is different from that of the salient poles of the preceding embodiment.
Figure 7:
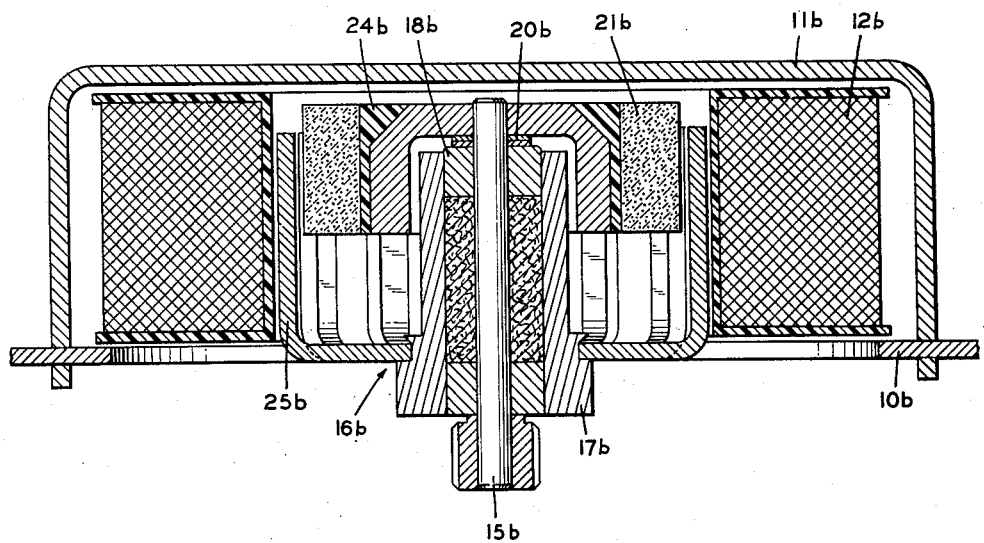
FIG. 7 is still another variation of the motor, in which the salient stator poles are formed from portions of the mounting plate, bent inwardly.

FIGURES 6 and 7 show other embodiments of the motor. In FIGURE 6, instead of employing a separate member 13 supporting the salient poles 25, as in FIGURES 1 and 2, salient poles 25a are formed by piercing portions of the cover 11a and bending them inwardly, thereby eliminating a part. It will be noted that in FIGURE 6, the salient poles extend into the motor from the opposite end from the arrangement shown in FIGURE 1. The air gap between the base plate 10a and the rotor member 21a in FIGURE 6 is less than the air gap between the rotor member 21 on the one hand and the radially extending portion of the member 13 in FIGURE 1, on the other hand.

In the particular embodiments illustrated in FIGURES 1, 6 and 7, during operation of the motor, flux follows a path extending from the salient stator poles into rotor poles of one polarity, thence circumferentially of the rotor to a rotor pole of opposite polarity, thence from said rotor to the stator end portions at one end of the stator, thence radially outwardly thereof, thence longitudinally of the outside portions of the stator, thence radially inwardly through the other end portions of the stator, and thence to and along the salient stator pole members of the stator.

The angular extent of the stator poles pierced from the cover in FIGURE 6 may be about 120 to 180 electrical degrees (10 to 15 mechanical degrees where there are 12 pairs of rotor poles), in this particular illustration about 144 electrical degrees (12 mechanical degrees). The angular spacing of the rotor poles may, in FIGURE 6 and in FIGURE 7, be the same as that which has been described in connection with FIGURE 3.

FIGURE 7 is generally like the arrangement of FIGURE 1, except that instead of employing the separate member 13 supporting the salient poles, the poles 25b are pierced from portions of the base plate 10b, which portions are then bent inwardly, as shown.

The construction and action of the embodiments shown in FIGURES 6 and 7 is otherwise generally in accordance with the preceding description of the embodiment of FIGURES 1–5.

Whereas various illustrative embodiments of electric rotating machines have been described in the form of motors, these and other embodiments of the present invention may be operated as generators, for generating alternating current, by mechanically driving the rotor, and deriving alternating voltage and current from the leads of the coil 12.

The principles of our motor are applicable to a wide variety of motors differing in geometry from the ones illustrated in the drawings of the present application.

From the above, it will be understood that there have been described self-starting electric rotating machines which will run at synchronous speed, which employ an entirely novel principle of construction and operation, and which enable great savings, while attaining excellent reliability.

In certain important embodiments, the quiescent position of the rotor is one in which individual ones of the stator poles at least partially bridge the space between adjacent magnetized regions of the rotor, and the rotor stops in its most favorable starting position.

This most favorable starting position is, in our motors, typically one in which the rotor position is displaced substantially 90 electrical degrees from one in which similar rotor poles would be centered opposite stator poles. In this position, in the motors illustrated in the drawings, each stator pole is substantially equidistant from members of a pair of rotor poles.

In the embodiments shown in the drawings, the set of salient stator poles is positioned adjacent a rotor having twice as many poles as those in the aforementioned set of salient stator poles. This is an advantageous arrangement, but in some cases the number of stator poles could be reduced, for example, so that a set of salient stator poles would face four times as many rotor poles as the number of salient stator poles in that set. This would comply with the previously mentioned arrangement in which the spacing of the stator poles would correspond to (N) (360) electrical degrees, where (N) is an integer.

In some prior motor designs, in order to cause the motor to start, shaded stator poles have been employed. Other expedients employed have been the use of non-symmetrical stator poles. The motors described herein are capable of reliable starting action without necessarily requiring the use of such expedients, and this is a significant advantage. It is, however, possible to use the teachings of the present invention in motors which are more complex than those illustrated in the attached drawings, for example, in motors employing shaded stator poles, or non-symmetrical stator poles, or a variety of additional features.

It will be understood that, in some motors employing geometries varying from those specifically described herein, it is possible to use some but not necessarily all of the novel features which are described in the present application, and to attain various important advantages. Thus, for example, the teachings described herein for attaining the quiescent rotor action and the self-starting action may be employed with different types of stator and rotor configurations, including various arrangements of their poles. Great advantages and economies may be attained in certain arrangements, as has been described, where there is employed a set of salient stator poles all of the same polarity, and this is believed to be an important novel feature, but the invention is not, in its broadest aspect, necessarily limited to this arrangement.

With the motor construction described herein, as the rotor rotates during operation of the motor, the flux switches between successive paths, and we believe the action to be as follows:

(a) When the flux produced by the stator coil approaches zero, the rotor approaches a first one of its positions where rotor poles straddle stator poles. When the rotor passes through such a position (see FIGURE 3 or FIGURE 4), there is a flux path for flux originating in the rotor, which path passes from a north pole of the rotor, to a stator pole, circumferentially through the stator pole, back to the adjacent south pole of the rotor, and back through the rotor to the first-mentioned north pole of the rotor.

(b) Later (one-fourth of an A.-C. cycle later), the rotor advances past a position where like rotor poles (for example north poles) are opposite stator poles. There is a flux path from these rotor poles to the stator poles, through the stator structure, around the coil, thence from the cover 11 back to a rotor pole of opposite polarity, and thence through the rotor back through the original rotor pole.

(c) Still later (one-half cycle after the first-mentioned condition) rotor poles again straddle stator poles, but because polarities are reversed, the flux direction is similar to that described in the first-mentioned condition described above in paragraph (a) but in the opposite direction.

(d) Still later (three-quarters of a cycle later than the first-mentioned condition) the flux path is like that described above in paragraph (b), but in the opposite direction.

Hence, during operation of the motor, there are four flux conditions, and, the flux tends to switch in succession through these four conditions. In two of the conditions there is a significant flux component running circumferentially of the stator poles (clockwise or counterclockwise). In the other two conditions, flux through the stator poles is predominantly in a longitudinal direction.

Another interesting and advantageous characteristic of our motors relates to the cooperation between (1) the torque produced by the interaction between the stator field and the rotor field and (2) the torque produced by attraction of the rotor poles for the stator poles when the stator flux is near zero. It is believed that the second of these torques, which may be referred to as the "cogging" or "de-energized" torque, is relatively strong at a time when the first of these torques is relatively weak, and that this is beneficial.

The starting action of our motors has been described, and a more detailed description of the sequence of events during starting is as follows:

Initially, before the power is applied, certain pairs of rotor poles straddle stator poles, and the clockwise and counterclockwise magnetic forces caused by the attraction of the rotor poles for the stator poles are in equilibrium. Assume, for example the position is as shown in FIGURE 3. (It could be a position where the rotor is shifted 180 electrical degrees from that position.)

When power is applied, the magnetic flux in the stator poles varies sinusoidally and hence they vary between north pole and south pole conditions. If the timing is such that the moment when the power is first applied corresponds approximately to the time when the stator poles are just entering their north pole condition, the rotor of FIG. 3 will be urged counterclockwise. The rotor is able to turn far enough from dead stop in one-half a cycle of the applied power that when the flux in the stator poles changes direction, the rotor will be in such position that the stator poles, now becoming of south pole polarity, again urge the rotor to continue turning in the same direction. The process is repeated successively, as the rotor continues to rotate at synchronous speed.

Assuming that the current is turned on at the instant of zero voltage, then as the voltage increases, the magnetic forces produced by the rotor tending to prevent rotation (or produce stable equilibrium) are first opposed, and then overcome, as the stator flux rises, and the rotor will start turning. As the rotor accelerates, the flux in the stator pole reaches a maximum, and then decreases to zero, at which time the rotor pole should have reached the center of the stator pole. Note that this initial starting pulse is exerted for 180 electrical degrees, or for $\frac{1}{120}$ of a second, whereas the rotor physically turns through a distance of only 90 electrical degrees, although it is accelerating rapidly. Because this distance is only one-half as great as the distance travelled when the rotor is rotating at full synchronous speed, this accounts for the ability of the rotor to start at zero speed, and get into step synchronously on the first one-half cycle.

The rotor now has momentum which carries it forward, past the 90 electrical degree point of unstable equilibrium which exists because the stator is now producing no flux. The rotor then continues with the aid of its own positive torque, which adds to opposite flux now coming up on the second half cycle current in the opposite direction. The rotor is now accelerated to a speed possibly even in excess of synchronous speed, so that it reduces what may be a larger angle of lag than necessary to carry whatever load the motor must turn.

After some hunting for proper phase angle to balance this load (assuming, of course, that the load is constant), the rotor settles down at a synchronous speed with a slight imposed ripple caused by the 60 cycle and 120 cycle pulsing torques.

The first electrical pulse entering the stator may be any fraction of a half cycle. If this fraction is extremely small, the starting pulse delivered to the rotor will not be sufficient to accelerate it to a point where it gains sufficient momentum, and travels far enough to pass the point of unstable equilibrium before the flux again becomes zero, so that when the flux increases in opposite polarity on the subsequent one-half cycle, the rotor will be forced in the opposite direction by the rotor's own tendency to return to the original position of stable equilibrium, plus the magnetic force building up in opposite polarity of the stator pole. Thus the rotor will start in a direction determined by the polarity of the first pulse received, provided the pulse is sufficient to cause the rotor to turn past the point of unstable equilibrium, which is the point with the rotor poles opposed to the stator poles.

A high inertia load should preferably not be attached firmly, without backlash, to the rotor shaft, because it will then add to the inertia of the rotor itself, and the rotor may not be able to accelerate fast enough, or travel far enough, during the first magnetic pulse, to start.

In conclusion, there have been described herein certain illustrative embodiments of a broad new class of electric rotating machines, representing a radical departure from prior practice, the description including highly novel types of self-starting alternating current motors of such design as to enable important savings in manufacturing cost, the design having numerous other advantages, including great reliability.

While illustrative forms of the invention have been described in considerable detail, it will be understood that various changes may be made in the construction and arrangement without departing from the general principles and scope of the invention as defined by the appended claims.

We claim:

1. A self-starting synchronous motor having at least one set of adjacent salient stator poles, and a permanent-magnet rotor having pairs of poles, adjacent rotor poles being of opposite magnetic polarity, means for energizing the salient stator poles with alternating magnetic flux, so that at a given moment each salient stator pole in said set is of like magnetic polarity, said rotor being adapted consistently to assume a position with respect to said stator poles, when said motor is in a de-energized condition, in which each stator pole is substantially equidistant from members of a pair of rotor poles.

2. An A.-C. motor comprising a rotor having a plurality of permanently-magnetized pole regions of opposite magnetic polarity alternately disposed about its periphery, means for producing an alternating field of magnetic flux, stator means including a plurality of adjacent flux path members for said field positioned near said rotor, each of the adjacent flux path members near said rotor having, at a given moment, the same magnetic polarity as the other said members.

3. A motor according to claim 2 in which the number of said rotor poles is greater than the number of said flux path members of said stator.

4. In a synchronous A.-C. motor, a single set of salient stator poles, a field coil for producing in all the salient stator poles of said motor an alternating magnetized flux field, the alternations in said field in all said poles being in the same phase relationship, and a permanent-magnet rotor having a plurality of poles of alternate polarity spaced around its periphery and mounted for rotation in the magnetic field provided by said field coil and said stator poles.

5. A motor according to claim 4 in which said stator is adapted to cause said rotor to stop in such position that each stator pole bridges the space between a pair of rotor poles of alternate polarity, whereby to provide said motor with a self-starting characteristic.

6. A self-starting alternating current motor, comprising a rotor permanently magnetized in a plurality of poles of alternate magnetic polarity uniformly spaced about its periphery, and a stator having spaced poles adjacent said rotor, said stator being dimensioned and positioned to cause quiescent positions of said rotor to be substantially midway between rotor positions in which individual ones of said rotor poles are opposed to individual ones of said stator poles.

7. A synchronous motor having a rotor comprised of a plurality of permanently magnetized poles of alternate polarity, a stator having a plurality of stator poles near said rotor, means for energizing said stator poles in the same phase, said rotor having at least twice as many of said rotor poles as said stator poles, and being adapted to stop, when said stator is de-energized, at a quiescent position where some spaces between rotor poles are opposite stator poles and some spaces between rotor poles are opposite spaces between stator poles, but said individual rotor poles are displaced from the center of said individual stator poles so that, when said stator is again energized, said rotor is self-starting.

8. A motor according to claim 7 in which said quiescent position is one in which each said stator pole is substantially equidistant from members of the nearest pair of adjacent rotor poles.

9. A self-starting alternating current motor having a rotor permanently magnetized in a plurality of poles of alternate polarity, and a stator having spaced poles adjacent said rotor, positioned and adapted, when said motor is de-energized, to cause the forces produced by the magnetic attraction of the rotor poles for the stator poles to be in substantially stable equilibrium when a pair of adjacent rotor poles of opposite magnetic polarity straddle a stator pole.

10. An A.-C. synchronous motor having a rotor permanently magnetized in pole regions of alternate magnetic polarity and a stator having spaced salient poles near said rotor, the width of at least some of said stator poles being in the range from 120 to 180 electrical degrees of the spacing between successive rotor pole regions having the same polarity.

11. A rotary electric device comprising, in combination, a rotor comprising ferrite material, magnetized in a plurality of pole regions of alternate polarity, a stator having a plurality of spaced poles near said rotor, means for energizing said stator poles with an alternating magnetomotive force to cause said rotor to rotate, said rotor being adapted, when said stator is de-energized, to assume a position in which individual ones of said stator poles at least partially bridge the space between pairs of adjacent and oppositely magnetized regions of said rotor.

12. An alternating current motor having a cylindrical rotor comprising ferrite material permanently magnetized in non-salient rotor poles of alternate polarity uniformly disposed about its periphery, said rotor being mounted for rotation about an axis, a set of salient stator poles near said rotor poles, said stator poles being positioned to be intercepted by a plane perpendicular to the axis of said rotor in a region of the magnetic influence of said rotor poles, and means for energizing said salient stator poles so that, at a given moment, all said stator poles intercepted by said plane are instantaneously of the same magnetic polarity.

13. Apparatus according to claim 12, including a case member of ferromagnetic material at least partially surrounding said motor, said stator poles being supported by said member and connected in magnetic circuit relation therewith.

14. A self-starting synchronous motor comprising a case member of low reluctance ferromagnetic material, means forming stator poles, means for energizing said stator poles with alternating magnetic flux, said stator poles being energized in phase with one another, a permanently magnetized rotor having pairs of adjacent, non-salient poles of alternate polarity, said rotor being mounted for rotation within said stator poles, said stator and rotor being adapted to cause the quiescent rotor position to be substantially 90 electrical degrees of the spacing between successive rotor poles of the same polarity from a position where similar rotor poles would be centered opposite the stator poles.

15. An A.-C. synchronous motor comprising magnetic flux means for producing an alternating flux field and for defining paths for it, a rotor suspended for rotation about its axis adjacent said means, said rotor having a portion comprising magnetic material having low permeability and high coercivity, said portion having a plurality of limited magnetized regions induced therein at substantially uniform angular spacings about said axis, alternate regions being magnetically oriented in opposite polarity, said magnetic flux means including a single group of adjacent salient flux path members for said alternating field, spaced about said axis within the influence of the flux fields of said magnetized regions of said rotor, said flux path members in said group having the same instantaneous magnetic polarity with respect to each other.

16. A motor according to claim 15 in which said magnetic flux means includes a non-salient-pole region wherein the instantaneous magnetic polarity is opposite that in said group of salient flux path members.

17. An A.-C. synchronous motor, comprising means for producing an alternating flux field, and a rotor supported for rotation about its axis adjacent said means, said rotor being comprised of ferrite material and having on its surface a plurality of limited magnetized regions of alternate polarity at uniform angular spacings about said axis, said means comprising a field coil, stator housing members of magnetic metallic material arranged embracing the windings of said coil to provide a low reluctance magnetic circuit for said alternating field, said members including a plurality of adjacent, salient stator poles having uniform instantaneous magnetic orientation in said circuit and supported in said housing near the surface of said rotor at uniform angular intervals about said axis, said intervals being equal to (N) (360) electrical degrees of the rotor pole spacing, where (N) is an integer.

18. In a bi-directional self-starting synchronous motor, a rotor having a plurality of permanently magnetized pole regions of alternate polarity disposed about its periphery, a stator structure a portion of which is in the zone of magnetic influence of said rotor pole regions, adapted to cause the quiescent position of said rotor to be one where a pair of adjacent rotor poles of opposite magnetic polarity straddles said portion of said stator structure and passes flux circumferentially through it, and single-phase means for applying alternating flux to said stator structure to cause said rotor to turn.

19. A bi-directional inductor motor, comprising a permanent-magnet rotor having a plurality of north and south poles alternately disposed about its periphery, and a stator comprising a magnetic field structure having a plurality of salient poles of the same instantaneous polarity adjacent each other and near said rotor, said magnetic field structure being dimensioned and positioned to cause said rotor to stop, when said motor is de-energized, in its most favorable starting position.

20. A motor according to claim 19, in which, when said stator is de-energized, the reluctance along the magnetic path, from a given one of said rotor poles of one polarity, circumferentially across a stator pole to an adjacent rotor pole of opposite polarity, and thence through the rotor to the said given rotor pole, is less than the reluctance along a path from said given rotor pole of one polarity to a stator pole, thence through said stator to an adjacent stator pole, thence to an adjacent rotor pole of opposite polarity, and thence through said rotor to said given rotor pole.

21. An inductor motor having a rotor member permanently magnetized in pole regions of alternate polarity, and a stator comprising metallic material forming a magnetic flux path and comprising a set of adjacent stator poles located sufficiently near said pole regions of said rotor to interact magnetically with the same, said rotor member comprising ceramic magnet material having a much higher reluctance property than does the metallic material of said stator, and means for energizing said stator with alternating magnetic flux to cause all said set of stator poles to be instantaneously of identical magnetic polarity.

22. An inductor motor, comprising, a coil for producing alternating magnetic flux, stator means of low reluctance magnetic material in magnetic circuit relation with said coil for guiding said flux, said stator means including a pair of end portions forming magnetic paths extending radially near the respective ends of said coil, outside portions extending longitudinally along said coil outside the same, and salient pole members extending longitudinally partway along said coil inside the same, said salient pole members terminating at positions so as to leave an air gap between their ends and the adjacent end portion of said stator, and a rotor of low permeability magnetic material having permanently magnetized pole regions of alternate polarity, said stator and rotor forming a closed flux path which, during operation of said motor, extends from said salient stator poles into rotor poles of one polarity, thence through said rotor to adjacent rotor poles of opposite polarity, thence from said rotor across said air gap to the adjacent end portion of said stator, thence radially outwardly thereof, thence longitudinally of said outside portions of said stator, thence radially inwardly through the other end portion of said stator, and thence to and along said salient pole members inside said stator.

23. A self-starting synchronous motor having a single set of salient stator poles, means for energizing the set of salient stator poles with alternating magnetic flux so that at any given moment each of said salient stator poles is of like magnetic polarity, said stator having a non-salient pole region in which the magnetic polarity is opposite to that in said salient poles, and a permanent magnet rotor having at least one pair of adjacent magnetic poles of opposite polarity, positioned within the magnetic influence of said salient poles, the magnetic paths presented to said rotor by said stator being adapted to cause the quiescent position of said rotor to be one displaced approximately 90 electrical degrees of the rotor pole spacing from one in which said rotor poles are opposite said salient stator poles.

24. A self-starting synchronous motor, comprising a permanent-magnet rotor having at least one pair of adjacent poles of opposite polarity, and a stator structure having stator poles positioned near said rotor poles, said rotor comprising material of much higher reluctance than that of said stator structure, the path of minimum reluctance through said stator presented to said rotor when said rotor is in its quiescent position being one in which flux passes from a given rotor pole of one polarity, circumferentially through a nearby one of said stator poles, and back to an adjacent rotor pole of opposite polarity, whereby to cause said rotor consistently to assume a position with respect to said stator poles, when said stator is de-energized, in which individual ones of said stator poles at least partially bridge the space between said adjacent poles of said rotor.

References Cited in the file of this patent
UNITED STATES PATENTS

| 2,432,573 | Jorgensen | Dec. 16, 1947 |
| 2,691,112 | Clifford | Oct. 5, 1954 |
| 2,981,855 | Van Lieshout | Apr. 25, 1961 |